United States Patent [19]
Wardle

[11] Patent Number: 5,836,166
[45] Date of Patent: Nov. 17, 1998

[54] COOLING APPARATUS

[75] Inventor: David G. Wardle, Bridgewater, N.J.

[73] Assignee: The BOC Group plc, Windlesham, England

[21] Appl. No.: 864,608

[22] Filed: May 28, 1997

[30] Foreign Application Priority Data

Jun. 10, 1996 [GB] United Kingdom .................. 96 12041

[51] Int. Cl.[6] ...................................................... F25D 13/06
[52] U.S. Cl. .................................................. 62/63; 62/381
[58] Field of Search ........................................ 62/63, 381

[56] References Cited

U.S. PATENT DOCUMENTS

| | | | |
|---|---|---|---|
| 3,485,055 | 12/1969 | Webster et al. ............................. | 62/63 |
| 3,992,899 | 11/1976 | Spahn ......................................... | 62/381 |
| 5,036,673 | 8/1991 | Miller et al. ................................ | 62/381 |
| 5,186,019 | 2/1993 | Weyermanns et al. .................... | 62/381 |
| 5,220,802 | 6/1993 | Kiczek et al. . | |

FOREIGN PATENT DOCUMENTS 0 430 460 A2  7/1990  European Pat. Off. .

*Primary Examiner*—Ronald C. Capossels
*Attorney, Agent, or Firm*—R. Hain Swope; Salvatore P. Pace; William A. Schoneman

[57] ABSTRACT

The present invention provides a food freezing apparatus and method in which food is passed through an elongated tube in which it is subjected to both crust and atmospheric freezing before being removed for packing. The crust freezing is facilitated by spraying liquid cryogen onto the outside of the tube at an upstream portion thereof.

15 Claims, 2 Drawing Sheets

COOLING APPARATUS

The present invention relates to cooling apparatus and in particular, but not exclusively, to such an apparatus for deep freezing products.

BACKGROUND OF THE INVENTION

Presently known cooling apparatus include that disclosed in EP-A-0430460 in which a drum is mounted for rotary movement at an angle to the horizontal such that individual compartments in the drum successfully descend into and rise from a vessel containing cryogenic fluid. The drum is formed of a perforated mesh which effectively allows the cryogenic liquid to pass therethrough and come into direct contact with the products being frozen. Once frozen, the products are extracted from the drum and exit via a chute formed at the axis of rotation.

U.S. Pat. No. 5,220,802 discloses a method and apparatus for individually quick freezing small surface moist articles. Articles to be frozen are first immersed in a bath of cryogenic liquid to produce a frozen crust or layer thereon followed by agitation in contact with vaporized cryogen to complete freezing and prevent clumping of the particles. This latter stage of freezing is conducted in a rotary freezing tunnel which effectively tumbles the articles towards its outlet.

While both of the above apparatus provide adequate methods of freezing food, their consumption of cryogen is somewhat higher than might be desired.

It is an object of the present invention to reduce, and possibly eliminate, the problems of the above-mentioned arrangements.

SUMMARY OF THE INVENTION

The present invention provides a method of cooling or freezing products which comprises depositing the products on an inner surface of a rotatable tube having a first upstream portion and a second downstream portion and exposing the outer surface of the upstream portion of the tube to a liquid cryogenic medium thereby causing heat transfer between the outer and inner surfaces thereof and wherein the rate of heat loss from product on the inner surface while in said upstream portion is such that thermal contraction causes any bond between the product and the tube to be broken, thereby permitting the product to be transported for further cooling or freezing in the second portion of the tube.

DETAILED DESCRIPTION OF THE INVENTION

The upstream portion of the rotatable tube cooling apparatus of the present invention may be cooled by passage through a bath of liquid cryogenic medium as the tube rotates, but preferably is cooled by spraying the cryogenic medium onto the outer surface thereof. Advantageously, the interior of the tube is exposed to cryogenic vapor, thereby to further cool/freeze any products as they pass along the second portion thereof.

Conveniently, the cryogenic vapor comprises the vapor of any liquid cryogen used to cool the upstream portion and which is directed into the interior of the tube. Preferably, the cryogenic vapor comprises vapor created by spraying liquid cryogen directly onto the exterior of the tube. Advantageously, the exterior of the second portion of the tube also exposed to cryogenic vapor.

According to another aspect of the present invention, there is provided an apparatus for cooling or freezing products comprising an elongated tube mounted for rotation about a longitudinal axis and having an inlet for receiving product, an outlet for allowing product to exit and chilling means for chilling the tube and hence to product contained therein. The apparatus is characterized in that the chilling means comprises means for exposing the outer surface of an upstream portion of the tube to a liquefied cryogenic medium, thereby causing heat transfer between the outer surface and the inner surface that initially causes the product to adhere to the surface but also produces thermal contraction causing any bond between the product and the tube to be broken, thereby permitting the product to be transported along the tube and further cooled therein without adhering thereto.

Preferably, the apparatus includes first spraying means for spraying liquid cryogen onto the outer surface of the first portion of the tube. Alternatively, the apparatus might include a liquid cryogen bath through which the upstream portion of the tube is passed as the tube rotates. Advantageously, the apparatus further includes means for exposing the interior of the tube to cryogenic vapor, for example, means for directing the vapor of the liquid cryogen used to cool the outer surface of the tube to the interior thereof. Alternatively, the means may comprise a spray bar for spraying liquid cryogen directly onto the interior of the tube, thereby creating cryogenic vapor for cooling product therein.

Advantageously, the apparatus of the present invention further includes vapor transporting means, e.g. one or more fans, for directing at least a portion of any generated vapor over the outer surface of the downstream portion of the tube. Preferably, the apparatus further includes an insulated outer casing in which the tube is positioned for rotation. Conveniently, the tube further includes one or more removable access hatches for allowing access to the interior of the tube.

Figure 1:
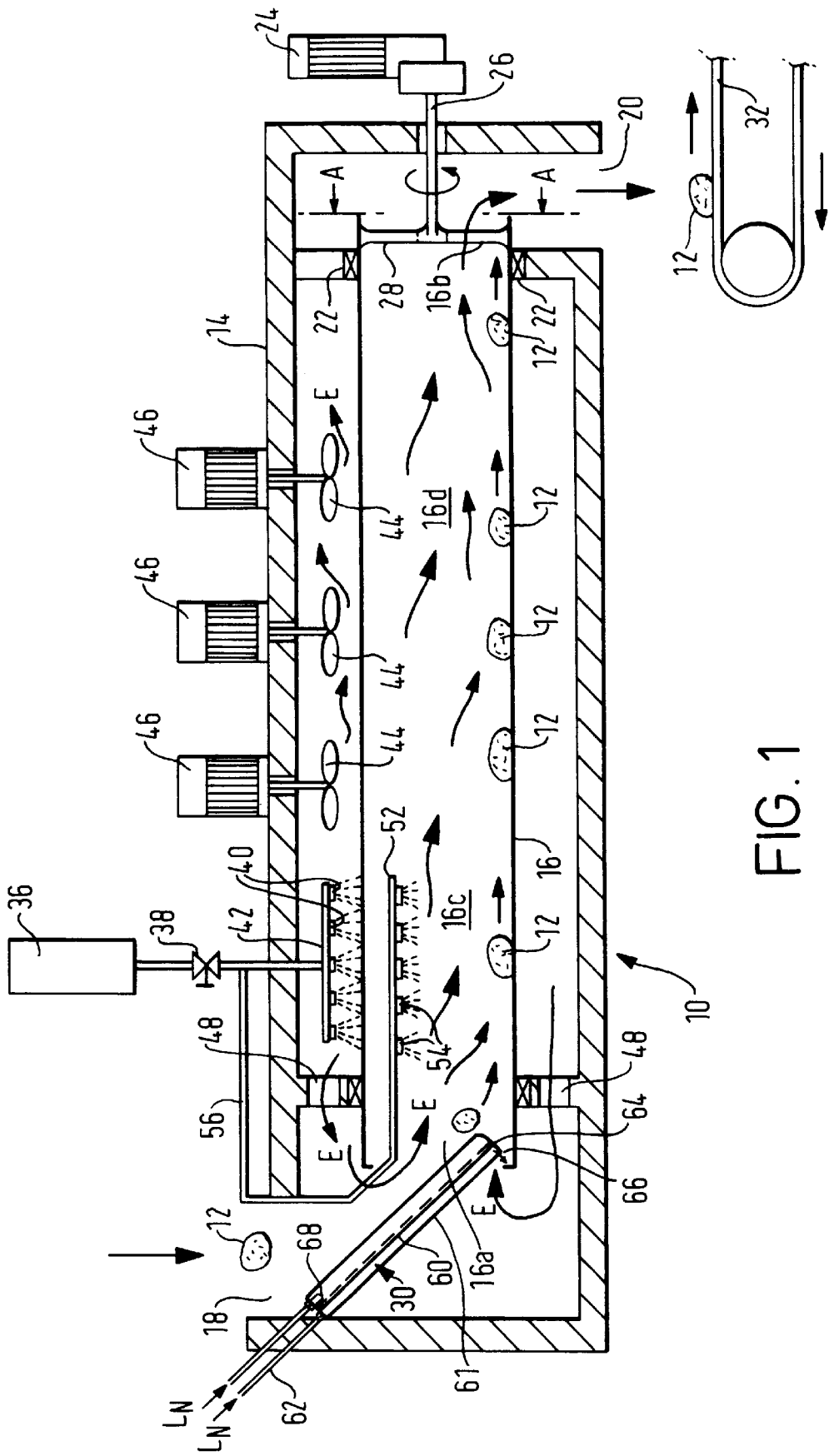
FIG. 1 is a cross sectional view of a cooling apparatus in accordance with the present invention.
Figure 2:
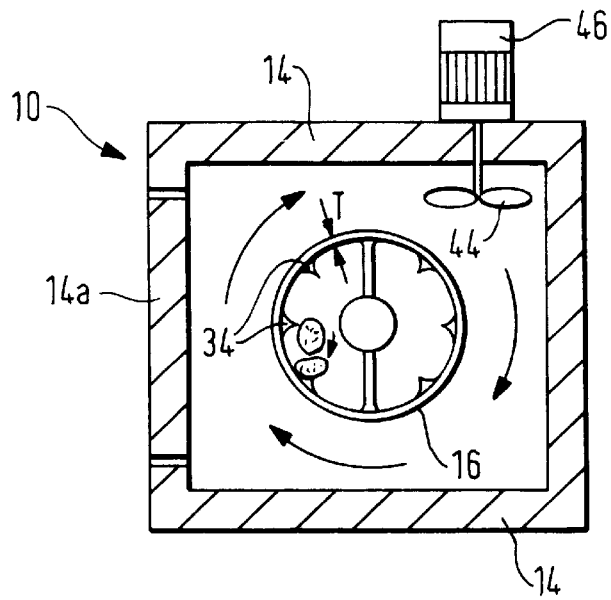
FIG. 2 is a cross sectional view taken in the direction of arrows AA in FIG. 1.

The present invention will now be more particularly described by way of example only with reference to the drawings. As shown in FIGS. 1 and 2, an apparatus 10 for cooling products such as solid foodstuffs 12 includes an insulated housing 14 having a thin walled freezing tube 16 extending therethrough between an inlet 18 and outlet 20. The tube 16 is formed from comparatively thin metal sheet, described in detail later herein, and is mounted in bearings 22 for rotation about longitudinal axis X—X. Motor 24 is operably linked to the tube via shaft 26 and cross bracing 28. The apparatus 10 further includes an optional inlet chute 30 for directing products 12 into an inlet end 16a of the tube and for depositing them on a bottom portion thereof. The outlet end of the tube 16b is provided with large gaps between cross-bracing 28 through which food items 12 may pass as they exit the end of the tube. Frozen food items 12 may be dropped onto a conveyor belt 32 or may be removed by means of a further chute (not shown). The tube 16 may also be provided with a plurality of food lifters in the form of elongate means 34 shown in FIG. 2 as elongated ribs, but which may be helical or linear. The tube itself comprises an upstream portion 16c and downstream portion 16d the functions of which will be described in detail later herein.

As stated above, the tube 16 is formed of comparatively thin material having a good thermal conductivity. The thickness T per se is not critical to the effective operation of the present invention, rather it is the thermal conductivity of the tube material in combination with its thickness which is important. It has, however, been found that a stainless steel tube having a thickness in the region of between 0.5 mm and 5 mm provides for good performance characteristics. Conveniently, the tube may be formed from sheets of stainless steel which is then rolled to form the tube itself.

The first upstream portion 16c is provided with a liquid cryogen spray system on the outer surface thereof. The spray system comprises a source 36 of liquid cryogen, e.g. liquid nitrogen, valve means 38 for controlling the flow of cryogen and a plurality of spray nozzles 40 positioned along spray bar 42. The nozzles are positioned for directing a spray of liquid cryogen onto the outer surface of the upstream portion 16c of tube 16 thereby rapidly chilling the surface and cause subsequent chilling of the inner surface of the tube. Direct liquid contact creates a very low inner tube surface temperature which is exploited by the operating steps described in detail later herein. The second, i.e. the downstream, portion 16d of the tube 16 is provided with a plurality of circulation fans 44 driven by motors 46. These fans effectively act to circulate any vapor created from the vaporization of liquid cryogen dispensed from nozzles 40 along and around at least the exterior surface of the remaining portion of tube 16. Excess vapor may be directed through apertures 48 and entrained into the interior of tube 16 as shown by arrows E.

Figure 3:
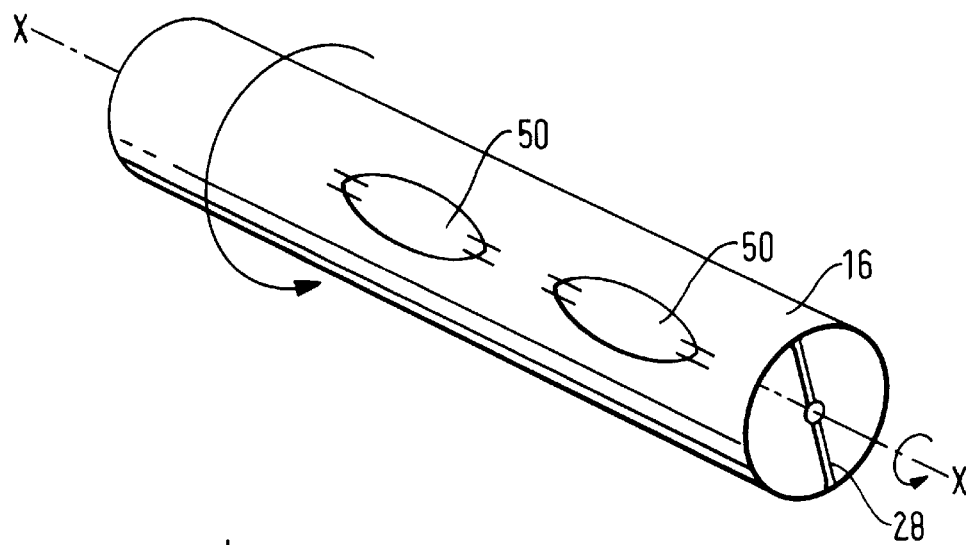
FIG. 3 is a general view of the exterior portion of the freezing tube of FIG. 1.
Figure 4:
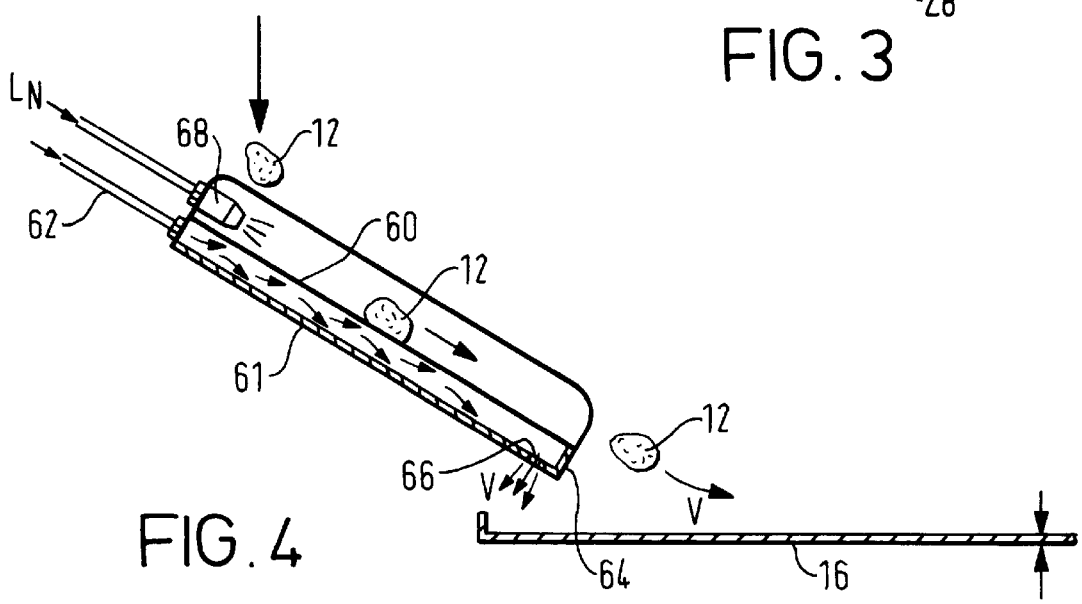
FIG. 4 is a detailed view of the zero adhesion chute shown in FIG. 1.

In FIG. 3, it will be seen that tube 16 may be provided with one or more access hatches 50 for allowing access to the interior of the tube during cleaning. If such access hatches 50 are provided, it might be appropriate for corresponding portions of the insulated casing 14 to be provided with removable portions 14a as best seen in FIG. 2. In certain circumstances, the apparatus 10 may include a further spray bar arrangement 52 which is positioned on the inside of tube 16. This spray bar arrangement 52 is provided with spray nozzles 54 for directing liquid cryogen onto at least the upstream portion 16c of the tube 16. This second spray bar arrangement 52 is linked by a line 56 to the source 36 of liquid cryogen. Also shown in FIG. 1 and 4 is an optional "zero adhesion" chute 30. The chute itself comprises a double skinned base shown as items 60 and 61. Liquid cryogen is supplied by inlet pipe 62 to a space 64 formed between surfaces 60,61. The liquid cryogen effectively acts to chill surface 60 such that a zero adhesion surface is created and food products 12 are thus prevented from adhering to the chute surface 60 as they enter the apparatus. This zero adhesion phenomena is described in detail later herein. As the liquid cryogen passes down between surfaces 60, 61 it continues to chill surface 60 while also vaporizing. A lip 64 provided at the bottom of surface 61 effectively acts to reduce, if not eliminate, the possibility of liquid cryogen overspill into tube 16 itself. Cryogenic vapor V is passed into the tube 16 via outlet 66 and acts to provide a cryogenic chilling atmosphere while the remaining gas creates a back pressure which causes space 64 to fill with said gas. Also provided at the inlet to chute 30 is a spray nozzle 68 which acts to spray a liquid cryogen along the upper surface 60. This cryogen also helps to chill the upper surface 60 and assists in the production of a zero adhesion surface.

Operation of the above-mentioned apparatus 10 is achieved by causing tube 16 to rotate while spraying at least the outer surface of upper region 16c with liquid cryogen from spray nozzles 40. This liquid cryogen acts to chill the skin of the tube 16 to such a degree that any food items being deposited thereon initially bond to but are then subsequently debonded or released therefrom by thermal contraction and their outer surfaces are rapidly chilled to produce an outer crust of frozen material. Once this outer crust has been established, the food products may be passed to a second downstream section 16d in which further chilling and freezing thereof takes place. Clearly, the crust of frozen material prevents the product from adhering to the downstream section 16d of the tube 16.

The further freezing/cooling which takes place in the downstream section 16d may be carried out in any one of a number of different ways. Preferably, as shown in FIG. 1, cryogenic vapor produced during the spraying of liquid cryogen onto the outer surface of tube 16 can be circulated around the outside of the tube 16 by fans 44 and then directed through apertures 48 and into the inlet end of tube 16 as shown by arrows E. Once within the tube, the cryogenic vapor is passed therethrough and exchanges heat with the food products 12 before being expelled from the outlet end 20. Alternatively, and in the case of large or particularly dense food products where a large amount of heat must be extracted from the food products 12, the secondary spray bar arrangement 52 may be employed to create a further chilling effect in the upstream and/or downstream portions of tunnel 16. The spray bar and nozzle arrangement 52 54 can be configured for directing liquid cryogen directly onto the inner surface of the tunnel whereby it acts to create a zero adhesion surface due to the rapid chilling effect thereof, may be configured to spray the food products 12 with liquid cryogen throughout their passage through tube 16, or may utilized to generate a mist of small droplets which are rapidly vaporized so as to produce a cryogenic vapor which envelops the food products 12 within the tube 16. If desirable, the zero adhesion feed chute 30 may be employed to ensure that food products 12 do not stick to the chute 30 as they are being loaded into tube 16.

I claim:

1. A method of chilling products comprising passing said products through a rotatable tube having a first upstream portion and a second downstream portion, the product being chilled in both of said portions, the method including the step of contacting the outer surface of the upstream portion of the tube with a liquid cryogenic medium thereby causing sufficient heat transfer between the outer and inner surfaces thereof so that the rate of heat loss from any of said products which become deposited on the inner surface of said upstream portion is such that the resultant thermal contraction causes any bond between the product and the tube to be broken, thereby permitting said products to be transported for further chilling in said second downstream portion of the tube.

2. A method in accordance with claim 1, wherein the liquid cryogenic medium is sprayed into the outer surface of the upstream portion of the tube.

3. A method in accordance with claim 1, wherein the chilling in the second downstream portion of the tube is carried out by contacting said products with cryogenic vapor in the tube.

4. A method in accordance with claim 3, wherein said cryogenic vapor in the second downstream portion of the tube comprises the vapor of the liquid cryogenic medium used to contact the upstream portion which vapor is directed into the interior of the tube.

5. A method in accordance with claim 3, wherein said cryogenic vapor in the second downstream portion of the tube is created by spraying liquid cryogen directly into the interior of the tube.

6. A method in accordance with claim 1, wherein the exterior of the second downstream portion of the tube is contacted with cryogenic vapor.

7. A method in accordance with claim 6, wherein the cryogenic vapor comprises the vapor of the liquid cryogenic medium used to contact the upstream portion of the tube.

8. An apparatus for chilling products comprising an elongated tube mounted for rotation about a longitudinal axis, having an inlet for receiving product and an outlet for allowing product to exit, means for rotating said tube to cause product to pass therethrough, first chilling means for chilling an upstream portion of the tube comprising means for directing liquefied cryogenic medium against the outer surface thereof thereby causing a rate of heat loss from any of said products which become deposited on the inner surface of said upstream portion such that the resultant thermal contraction causes any bond between the product and the inner surface of the tube to be broken thereby causing any product adhering to the inner surface to release therefrom and be transported through the tube and means for further chilling the product in a downstream portion of the tube as the product passes therethrough.

9. An apparatus in accordance with claim 8, wherein said first chilling means comprises spraying means for spraying liquid cryogenic medium onto the outer surface of the upstream portion of the tube.

10. An apparatus in accordance with claim 8, wherein said means for chilling the downstream portion of the tube comprises means for directing the vapor of the liquid cryogenic medium used to chill the outer surface of the upstream portion of the tube to the interior of the tube.

11. An apparatus in accordance with claim 8, wherein the means for chilling the downstream portion of the tube comprises a spray bar for spraying liquid cryogen directly into the interior of the tube.

12. An apparatus in accordance with claim 8 including vapor transporting means for directing at least a portion of any vapor generated in chilling the upstream portion of the tube over the outer surface of the downstream portion of the tube.

13. An apparatus in accordance with claim 12, wherein the transporting means comprises one or more fans.

14. An apparatus in accordance with claim 8 further including an insulated outer casing in which the tube is positioned for rotation.

15. An apparatus in accordance with claim 8, wherein the tube further includes one or more removable access hatches for allowing access to the interior of the tube.

\* \* \* \* \*